US010120786B2

(12) United States Patent
Kremp

(10) Patent No.: US 10,120,786 B2
(45) Date of Patent: Nov. 6, 2018

(54) PROGRAMMATIC ACCESS CONTROL VALIDATION

(71) Applicant: SAP SE, Walldorf (DE)

(72) Inventor: Juergen Kremp, Walldorf (DE)

(73) Assignee: SAP SE, Walldorf (DE)

( * ) Notice: Subject to any disclaimer, the term of this patent is extended or adjusted under 35 U.S.C. 154(b) by 143 days.

(21) Appl. No.: 15/376,992

(22) Filed: Dec. 13, 2016

(65) Prior Publication Data

US 2018/0165183 A1    Jun. 14, 2018

(51) Int. Cl.
*G06F 11/36*    (2006.01)
*G06F 21/44*    (2013.01)

(52) U.S. Cl.
CPC ...... *G06F 11/3688* (2013.01); *G06F 11/3692* (2013.01); *G06F 21/44* (2013.01)

(58) Field of Classification Search
CPC ............................. G06F 11/36; G06F 11/3688
USPC ...................................................... 714/38.1
See application file for complete search history.

(56) References Cited

U.S. PATENT DOCUMENTS

| | | | | |
|---|---|---|---|---|
| 6,308,274 | B1* | 10/2001 | Swift | G06F 21/604 710/200 |
| 2007/0244837 | A1* | 10/2007 | Plow | G06Q 40/06 705/36 R |
| 2013/0185056 | A1* | 7/2013 | Ingram | G06F 11/3684 704/9 |
| 2015/0350194 | A1* | 12/2015 | Gilpin | H04L 63/0815 726/8 |
| 2016/0259750 | A1* | 9/2016 | Keidar | G06F 9/45558 |
| 2016/0335423 | A1* | 11/2016 | Beals | H04L 12/2825 |
| 2017/0286265 | A1* | 10/2017 | Moth | G06F 11/3644 |

* cited by examiner

*Primary Examiner* — Kamini B Patel
(74) *Attorney, Agent, or Firm* — Schwegman Lundberg & Woessner, P.A.

(57) ABSTRACT

Techniques of validating access controls within an application are disclosed. A validation test is performed by receiving test data comprising one or more privilege elements selected from a set of privilege elements representing a privilege scheme defined in an application. The test data and a data set are accessed. The application is executed using the data set according to the one or more privilege elements. A set of interaction indicators is generated representing interactions of the application with a portion of the data set. The set of interaction indicators is presented at a display device of a computing device.

20 Claims, 9 Drawing Sheets

PROGRAMMATIC ACCESS CONTROL VALIDATION

TECHNICAL FIELD

Embodiments of the present disclosure relate generally to validation of processor-executable instructions. More particularly, but not by way of limitation, the present disclosure addresses systems and methods for automatically validating access control schemes within processor-executable instructions in a runtime environment.

BACKGROUND

Databases store data within accessible data structures. Relational databases store data in tables, with each table having one or more keys relating the table to other tables in the database. Requesting data from a relational database involves querying a relational database management system (RDBMS) using a relational database query language, such as Structured Query Language (SQL). Databases, individual data structures, or data tables are sometimes generated with access controls defining characteristics of users or instances granted authorization to access the data.

In recent years, software development, and specifically business-related software application development, has moved towards a cloud-based environment where developers interact with an application server to create and manage software objects related to the applications being developed. Developers use differing programming languages and components to provision and provide access controls for applications accessing data in the cloud-based environment. A programming language for developing applications for accessing and controlling access to data is the Advanced Business Application Programming (ABAP) language, developed by SAP SE, of Walldorf, Germany.

Access control for data within databases or cloud-based environments is often a part of data processing. Access controls define the data which may be seen or modified based on permissions or authorizations assigned to individual users, groups of users, resources, and systems in communication with the source of data.

Validation of access controls is often performed manually. To validate an access control scheme, a developer often creates a mock user, defining a profile, access controls and permissions, and sets of data or data structures accessible by the mock user. Creation of mock users is often a labor-intensive and error-prone process. The mock user profiles are often resource-intensive creations unsuitable to scaling of the validation testing process. Validation of access controls is sometimes performed using programmatic tests of software. Programmatic validation often employs access control permissions coupled to the user performing the validation process. Such programmatic validation tests often proactively remove dependencies of access controls and users performing the validation testing in order to achieve stable results.

BRIEF DESCRIPTION OF THE DRAWINGS

Some embodiments of the present disclosure are illustrated by way of example and not limitation in the figures of the accompanying drawings, in which like reference numbers indicate similar elements, and in which.

DETAILED DESCRIPTION

Figure 1:
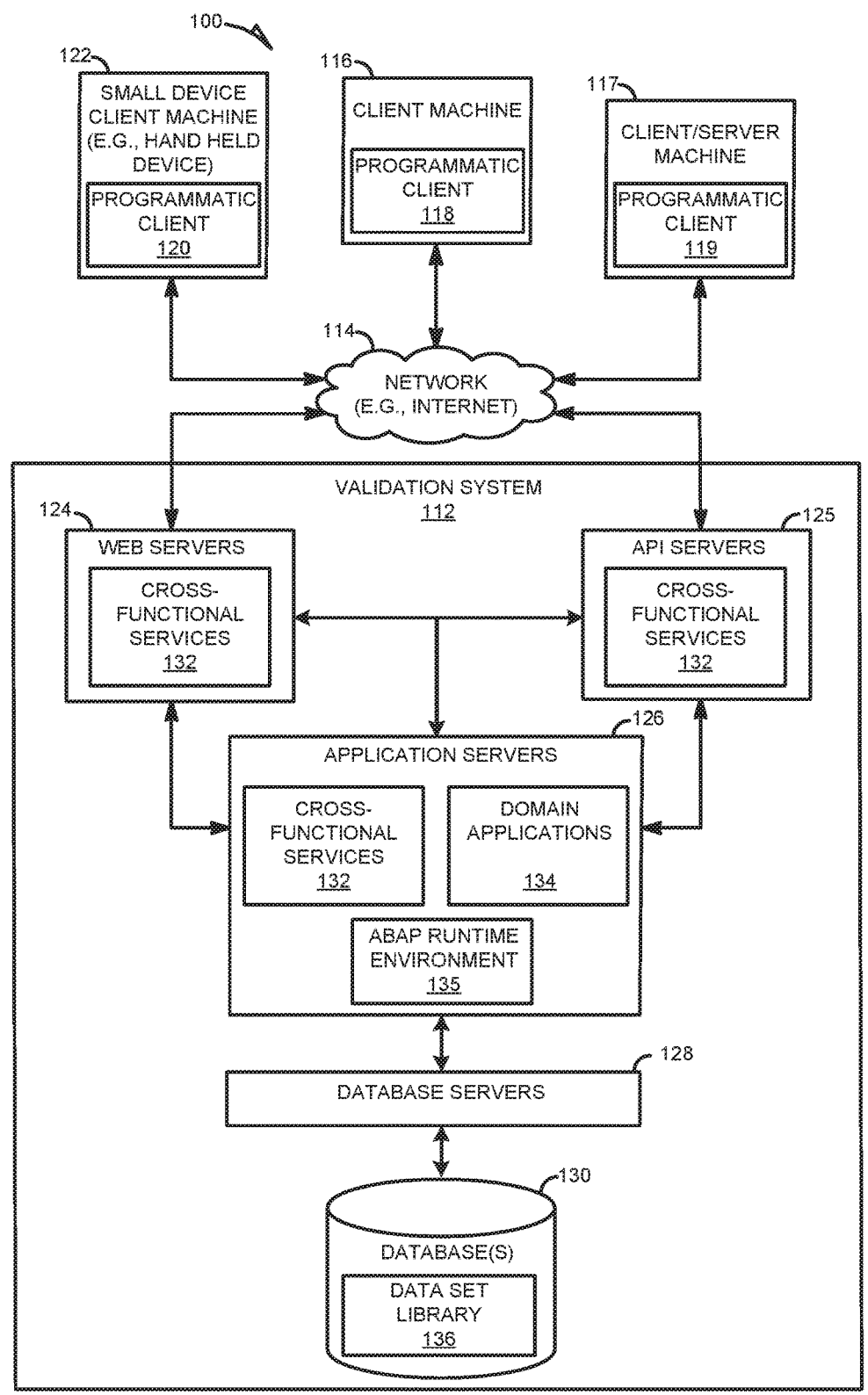
FIG. 1 is a network diagram illustrating a validation system for validating access controls of applications, in accordance with some example embodiments.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Access control is often an integral part of data processing. Access control defines which portions of data which may be accessed, modified, or displayed based on user authorizations assigned to individual users or groups of users of a given application or system. Users with differing access control privileges, executing the same functionality within an application or system, receive differing results based on the respective privilege levels and characteristics of the data being accessed. Access control schemes are often built or otherwise integrated into applications or systems by developers, programmers, or creators of those applications and systems. During or after creation of an application or system, responsible parties often test access control schemes to determine whether the outlined schemes provide expected results.

In an example embodiment, a validation system is described for determining validity of access control schemes defined within a set of processor-executable instructions. In some embodiments, a developer generates an application comprising the set of processor-executable instructions. The application includes one or more access control schemes defining available actions of users with respect to data sets accessible by the application. Using a framework provided by the validation system, the application also includes a test container. The test container is configured to enable automatic testing to validate the access control scheme. The automatic testing decouples test results from a user executing the tests. Decoupling the test results from the executing user provides stable test results without first employing steps to remove access control dependencies of the user. In some embodiments, the testing container provides a mechanism to simulate the output of the application or system's processor-executable instructions based on differing user authorizations without creating differing mock user profiles. In such embodiments, injection of test data into the validation system indirectly influences the output of the application, where the application uses the access control enforcement framework of the validation system as an intermediary in performing specified operations. The test container may contain reference application output data. Upon injection of the test data into the application, appearance of the reference application output data within the output of the application verifies the test data and the access control scheme within the validation system.

In some embodiments, the validation system contains a framework for testing execution. Applications or systems may incorporate the framework for testing execution by defining a test container according to the framework of the validation system. The test container is a portion of processor-executable instructions configured to receive one or more privilege elements. The one or more privilege elements comprise formatted processor-executable instructions and values representing one or more characteristics of an access control scheme outlined in the application or system. The test containers provide a location for programmatic access to underlying access control components or schemes of the application or system. In some embodiments, the test container is configured to receive indications or values representing a data set on which the one or more privilege elements will be tested. The data set may be mock data to be processed by the application during testing execution. The mock data of the data set may be distinct from production data used by the application when in production (e.g., in normal use outside of testing). In some instances, the test container is configured to receive an access control double into a runtime component of the application or system. The one or more privilege elements or the access control double are controlled by the framework of the validation system for high-level database objects to verify correctness of the access control scheme or access control definitions of the application and corresponding to use of the data set.

The methods or embodiments disclosed herein may be implemented as a computer system having one or more components (e.g., hardware modules). Such components may incorporate one or more processors of the computer system. In some embodiments, a non-transitory machine-readable storage device stores a set of instructions that, when executed by at least one processor, causes the at least one processor to perform the operations and method steps discussed within the present disclosure.

FIG. 1 is a network diagram illustrating a client-server system 100, in accordance with an example embodiment. A platform (e.g., machines and software), in the example form of a validation system 112, provides server-side functionality, via a network 114 (e.g., the Internet) to one or more clients. FIG. 1 illustrates, for example, a client machine 116 with programmatic client 118 (e.g., a browser), a small device client machine 122 with programmatic client 120 (e.g., a browser), and a client/server machine 117 with a programmatic client 119.

Turning specifically to the example validation system 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130 comprising one or more data sets. Cross-functional services 132 can include relational database modules to provide support services for access to the database(s) 130, which includes a data set library 136. The web servers 124, API servers 125, application servers 126, and database servers 128 can host cross-functional services 132. The application servers 126 can further host domain applications 134. The application servers 126 may also host an ABAP Runtime Environment 135.

The cross-functional services 132 provide services to users and processes that utilize the validation system 112. For instance, the cross-functional services 132 can provide portal services (e.g., web services), database services, and connectivity to the domain applications 134 for users that operate the client machine 116, the client/server machine 117 and the small device client machine 122. In addition, the cross-functional services 132 can provide an environment for delivering enhancements to existing applications and for integrating third-party and legacy applications with existing cross-functional services 132 and domain applications 134. Further, while the system 100 shown in FIG. 1 employs a client-server architecture, the embodiments of the present disclosure are, of course, not limited to such an architecture, and could equally well find application in a distributed, or peer-to-peer, architecture system. In some instances, when testing execution across a distributed or peer-to-peer architecture system, the validation system 112 manages application of code origin validation in addition to testing execution. In such instances, the validation system 112 validates digital signatures of one or more machines associated with the distributed or peer-to-peer system to verify code origins for one or more of the application, the testing container, the mock data, and permissions for performing testing execution.

The validation system 112 can implement operations configured to perform validation operations to validate access control or privilege schemes defined within an application. In some embodiments, the validation system 112 is configured to provide programming and testing frameworks for creating and executing automatic software tests that decouple test results from a user executing the test and provide a developer, producing processor-executable instructions with access controls, a mechanism to simulate output of the processor-executable instructions based on differing user authorizations without employing differing users or generating separate mock user profiles.

In some instances, the validation system 112 provides a testing framework for programmatic software validation testing and execution. The testing framework may be configured for one or more programming languages (e.g., JUNIT for JAVA or ABAP UNIT for ABAP). The testing framework may be used by developers to define and orchestrate tests and execution of the defined tests. In some embodiments, testing code making use of access controls or privilege schemes programmatically accesses underlying access control or privilege schemes of a programmed application. The testing framework enables provisioning the application with virtual data representing production data used by an application during normal operation. The testing framework may integrate access control doubles into a runtime environment for a tested application. The runtime environment may be provided on a server of the validation system 112 controlled by the testing framework to verify correctness of access control or privilege definitions incorporated as part of the application and part of a data model or the data set.

Figure 2:
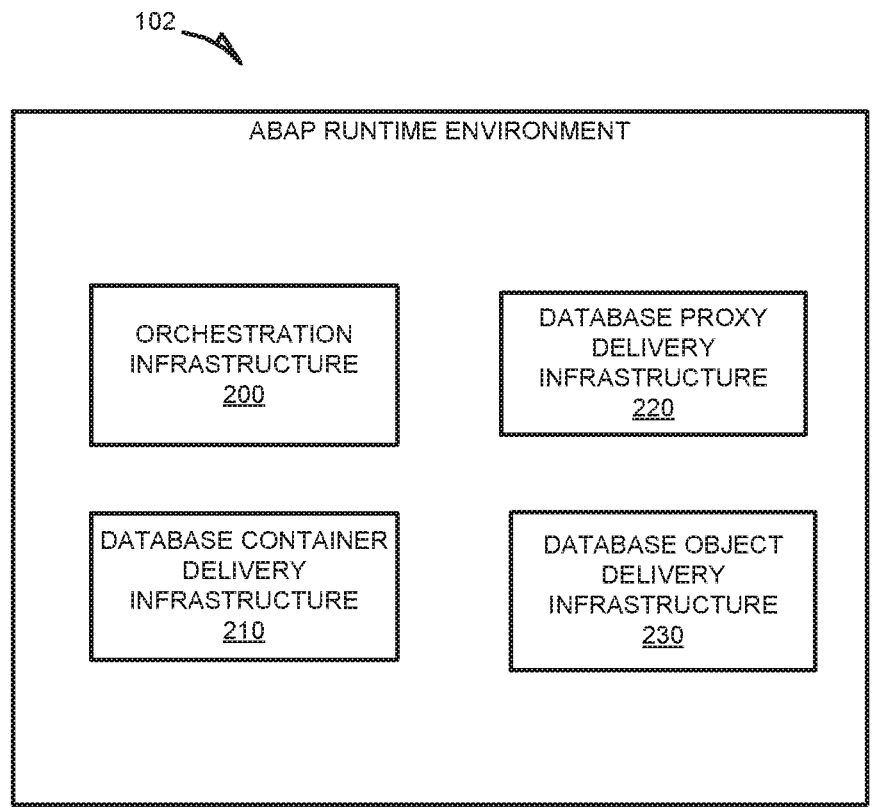
FIG. 2 is a block diagram illustrating an ABAP Runtime in more detail, in accordance with some example embodiments.

FIG. 2 is a block diagram illustrating the ABAP Runtime Environment 135 in more detail, in accordance with an example embodiment. The ABAP Runtime Environment 135, in addition to the components described in FIG. 1, includes an orchestration infrastructure (OI) 200, a database container delivery infrastructure (CDI) 210, a database proxy delivery infrastructure (PODI) 220, and a database object delivery infrastructure (ODI) 230.

The OI 200 orchestrates two or more independent development and delivery mechanisms for database content (DDMs), such as tables and views. Each delivery mechanism can compute dependencies and deploy content within its target environment. The OI 200 assigns one or more containers (e.g., database schemas) to each DDM. The OI 200 ensures cycle-free dependencies between objects and between different containers by limiting dependencies of objects belonging to two different containers in such a way that objects in a first container can depend on objects in a second container, but the objects in the second container cannot depend on objects in the first container. The OI 200 then computes a graph of container dependencies and orchestrates development via the individual DDMs along the graph. Within each DDM, development objects referencing objects in other containers are created first. This is described in more detail below.

The CDI 210 allows users to define a container logical name, container dependencies, container attributes, and access controls or privileges. The CDI 210 activates a container by creating a data structure with a physical name. The CDI 210 stores the mapping of the logical to the physical name.

The PODI 220 allows users to define a database object assigned to a logical container, referencing another database object assigned to another logical container. The PODI 220 verifies that containers are only referenced unidirectionally and computes a cycle-free graph of container dependencies. In some example embodiments, upon activation of a proxy object, the PODI 220 activation resolves the logical container names defining the physical container names and creates the object in the physical container it is defined for, referencing the object in the other physical container.

The ODI 230 allows users to specify a single object or a multitude of objects being newly created, changed, or deleted. The ODI 230 further locks objects against changes by other users, assigns the objects to a change list, exports the single or multiple object definitions referenced in the change list from one system, and imports them into another system. The ODI 230 also activates in the other system the single or multiple objects by mapping the logical container name specified in the object definition to the physical schema name corresponding to the logical schema name in the other system, and creating the object or altering the object in the physical database container. The object activation may be sorted along the container dependency graph, starting with containers without references to other containers, continuing with containers which have only references to already deployed containers, and continuing for all containers specified by objects along the container dependency. In some example embodiments, the ODI 230 utilizes the physical name to logical name mapping in the CDI 210 to create objects in the respective physical container.

It should be noted that, while in some embodiments, some or even all of the OI 200, CDI 210, PODI 220, and ODI 230 work together, in some example embodiments these may be standalone components that can operate independently of, or even without the presences of, any of the other components.

In an example embodiment, the concept of a logical schema name in the application is introduced. All development artifacts then use this logical schema name. During deployment, a physical schema with a unique name is created and assigned to the logical schema name. During a zero downtime upgrade, an alternative physical schema with another name can be created and assigned to the logical name. This allows developers to create objects that are machine-agnostic, with the physical names for the schemas containing these objects being resolved at deployment. The logical and physical schemas may be distinct from the access control or privilege scheme. In this manner, data set mocking for access control testing may be extended to full database mocking, including data and configuration, for further access control testing.

The application code in the application server accesses the database schema or data structure by schema resolution, retrieving the physical schema name by specifying the desired logical schema name. The application server infrastructure either returns the standard physical schema name or the temporary physical schema name during a zero downtime upgrade. The application code may also access testing data defining a set of privilege or access control elements and access a data store, data set, or a data structure.

The database objects and database code deployed via the database development environment define database synonyms or projection views for objects to be consumed from other database schemas using the logical schema name. The synonym and projection view is configured at creation time by resolving the logical name specified with the physical name used in the deployment. During a zero downtime upgrade deployment, the objects are created with the temporary schema name defined by the zero downtime updated procedure.

A schema development artifact is managed in the application server development environment. A logical schema can be defined. Upon deployment, the application server deployment creates a physical schema (defined name, globally unique identifier (GUID), computed name out of logical name, system identification, and other parameters) and stores the mapping between the logical schema name and the physical schema name in a mapping table. Upon access to the schema, the application server database interface resolves the logical name provided and accesses the database with the matching physical schema name.

A developer environment managed schema can access objects in the data dictionary (DDIC) managed schema or one of the additional database schemas. The developer declares which other schemas are accessible. This information is added to the schema development artifact. In some embodiments, a portion of the above-referenced schema corresponds to access controls or privileges of the access control or privilege scheme. In some embodiments, the data set used in testing execution is injected into memory for portions of the data set relevant to access control testing. In some instances, access control relevant data of the data set is delegated or inserted into a separate schema for additional dependency isolation. In such instances, the validation system 112 may incorporate code origin validation, access controls for accessing the data set and the separate schema, and other security precautions to authenticate access to the data set.

Figure 3:
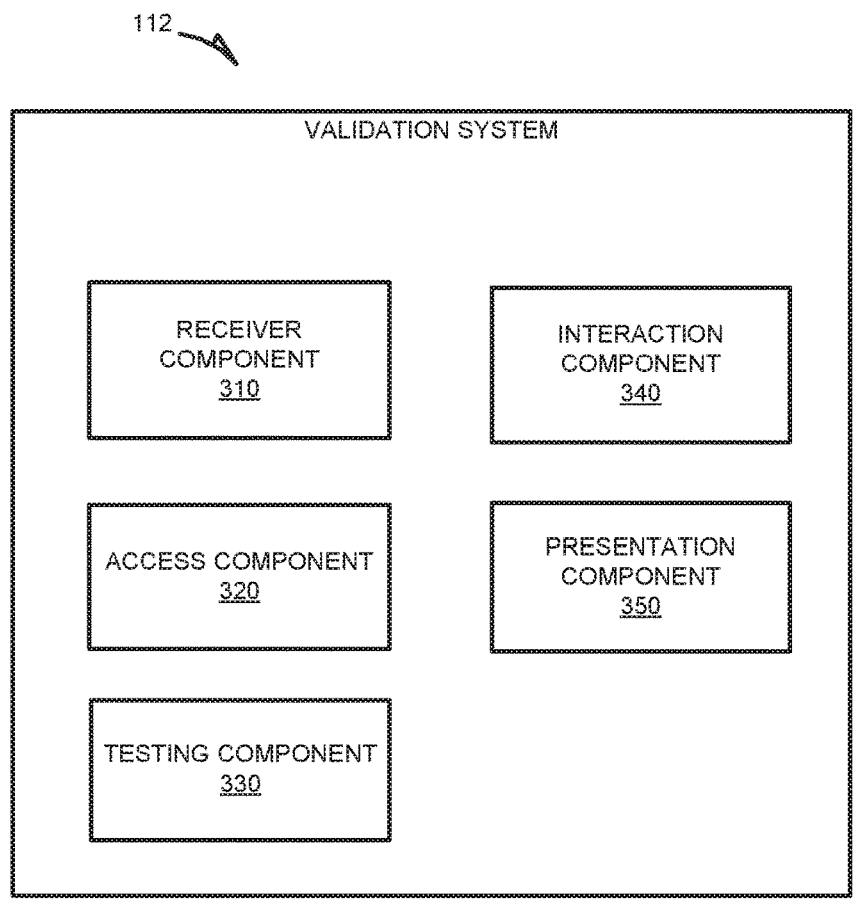
FIG. 3 is a block diagram of components of the validation system, in accordance with some example embodiments.

FIG. 3 is a block diagram of components of the validation system 112, according to some example embodiments. The validation system 112 can be implemented as a standalone system or implemented in conjunction with one or more client devices. The validation system 112 is shown to include a receiver component 310, an access component 320, a testing component 330, an interaction component 340, and a presentation component 350. Embodiments of the components, functionality of the components, and interactions of the components are described below, with respect to the various embodiments presented in the present disclosure. All, or some, of the components 310-350 communicate with each other, for example, via a network coupling, shared memory, and the like. Each component of the components 310-350 can be implemented as a single component, combined into other components, or further subdivided into multiple components. Other components not pertinent to example embodiments can also be included, but are not shown.

Figure 4:
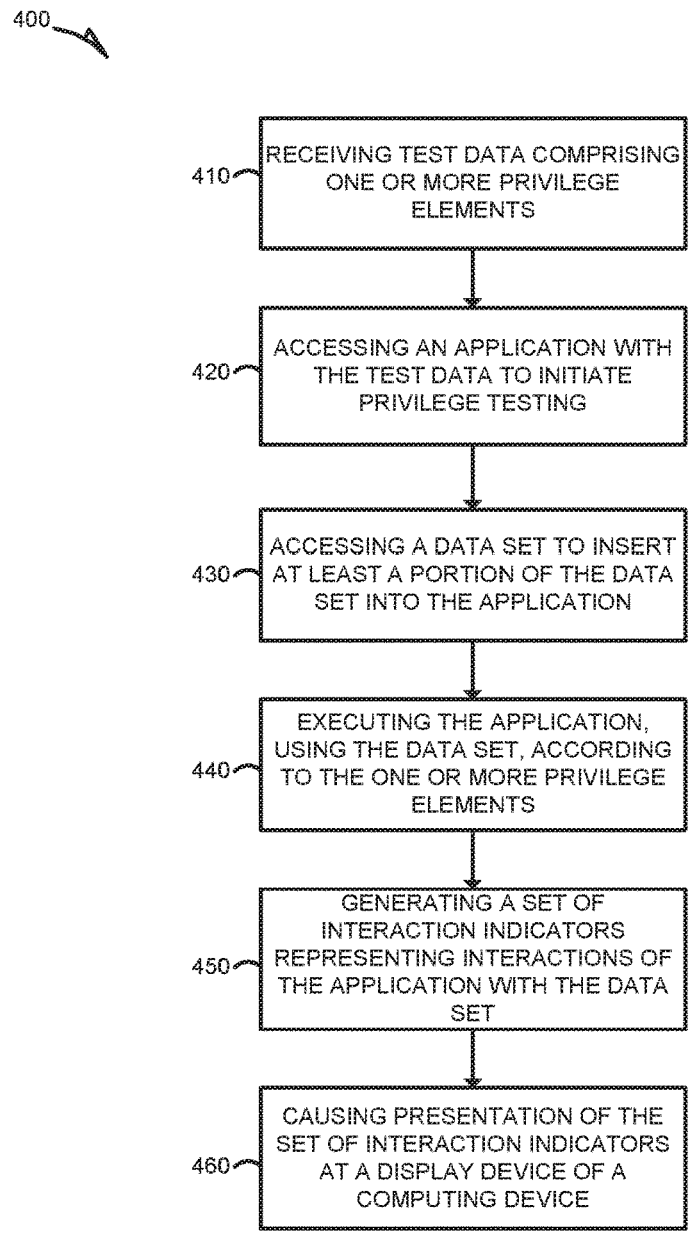
FIG. 4 is a flowchart illustrating an example method for automatically validating access controls defined within an application, in accordance with some example embodiments.

FIG. 4 is a flow chart illustrating a method 400 for automatically validating access controls defined within an application, according to an example embodiment. The method 400 may comprise a plurality of operations or sub-operations. The method 400 will be described with respect to being performed by components of the validation system 112. However, it should be understood that operations or portions of operations of the method 400 may be performed on the validation system 112, the client machine 116, the client/server machine 117, a mobile device, or combinations thereof.

In operation 410, the receiver component 310 receives test data comprising one or more privilege elements. The test data is received into a testing container defined within a set of processor-executable instructions comprising an application. In some example embodiments, an application is generated by a user of the validation system 112. The application comprises a set of processor-executable instructions configured to cause a processor to perform one or more specified operations. Among the set of processor-executable instructions, the application includes a privilege scheme and the test container. The privilege scheme comprises a set of access controls or permissions defining user access to various data sets in the application.

Privilege schemes may be defined by the application or system designer. In some embodiments, privilege schemes are created by the designer, programmer, or other responsible entity associated with the application or system. In some instances, the privilege schemes are or incorporate portions of known access control models. For example, privilege schemes may comprise an attribute-based access control mode, a discretionary access control model, a history-based access control model, an identity-based access control model, a mandatory access control model, an organization-based access control model, a role-based access control model, a responsibility-based access control model, combinations thereof, or any other suitable access control or privilege model.

The one or more privilege elements are selected from a set of privilege elements representing the privilege scheme. The set of privilege elements comprise fields representing one or more of credentials (e.g., roles, job titles, identity credentials, or system credentials), permissions (e.g., indications of an access mode), sessions, assignments, attributes (e.g., user attributes, resource or object attributes, action attributes, environmental attributes, or system attributes), geolocations, or any other suitable basis for granting an access control or privilege. Although described using certain privileges or bases for privileges, it should be understood that the one or more privilege elements may comprise any metric on which a privilege or access control may be based.

In some embodiments, a core data service (CDS) entity is used as a declarative way to model higher-level data provisioning objects. The CDS entity may act as a portion of the application or system. The objects may be used in programs, programming languages, frameworks, or systems used to develop applications or systems for creation and management of software objects. For example, the objects may be used in applications developed using the ABAP language described above. CDS entities may make use of data sources such as database tables containing the objects. For example, a code fragment, shown below, defines an example CDS entity with a name "Cds_With_Dcl_Pfcg". The example CDS entity is a projection onto database table SFLIGHT, exposing one or more fields within the database table.

```
define view Cds_With_Dcl_Pfcg as select from sflight
{
key sflight.carrid,
key sflight.connid,
key sflight.fldate,
sflight.currency,
sflight.planetype,
sflight.seatsmax,
sflight.seatsocc
}
```

The validation system 112 enables insertion of the test data into applications such as shown in the code fragment above. The validation system 112 provides a testing framework for insertion of the test data and testing of the application. The test framework provides access to the privilege scheme of the application or system in a runtime environment. An example code fragment for the test framework is provided below.

```
environment->get_access_control_double( )->enable_access_control(
    i_access_control_data = <DATA>
).
```

The test framework accesses the test container, <DATA>, into which the test data is received in operation 410. In these embodiments, the test fragment enables testing of the privilege scheme using the test data decoupled from the user executing the test. An example code fragment for the test framework is provided below.

```
DATA(...) = cl_cds_test_data=>create_access_control_data(
    i_role_authorizations = VALUE #(
      (
        object = 'S_CARRID'
        authorizations = VALUE #(
          (
            VALUE #(
              (
                fieldname = 'CARRID'
                fieldvalues = VALUE #(
                  ( lower_value = 'AA' )
                )
              (
                fieldname = 'ACTVT'
                fieldvalues = VALUE #(
                  ( lower_value = '03' )
                )
              )
            )
          )
        )
      )
    )
```

-continued

```
(
    object          = 'S_ACM_DEMO'
    authorizations  = VALUE #(
        (
            VALUE #(
                (
                    fieldname  = 'SACMTSOID'
                    fieldvalues = VALUE #(
                        ( lower_value = 'USD' )
                    ) " Values of field
                ) " End field
                (
                    fieldname  = 'SACMORGUID'
                    fieldvalues = VALUE #(
                        ( lower_value = 'B*' )
                    )
                )
            )
        )
    )
).
```

Figure 5:
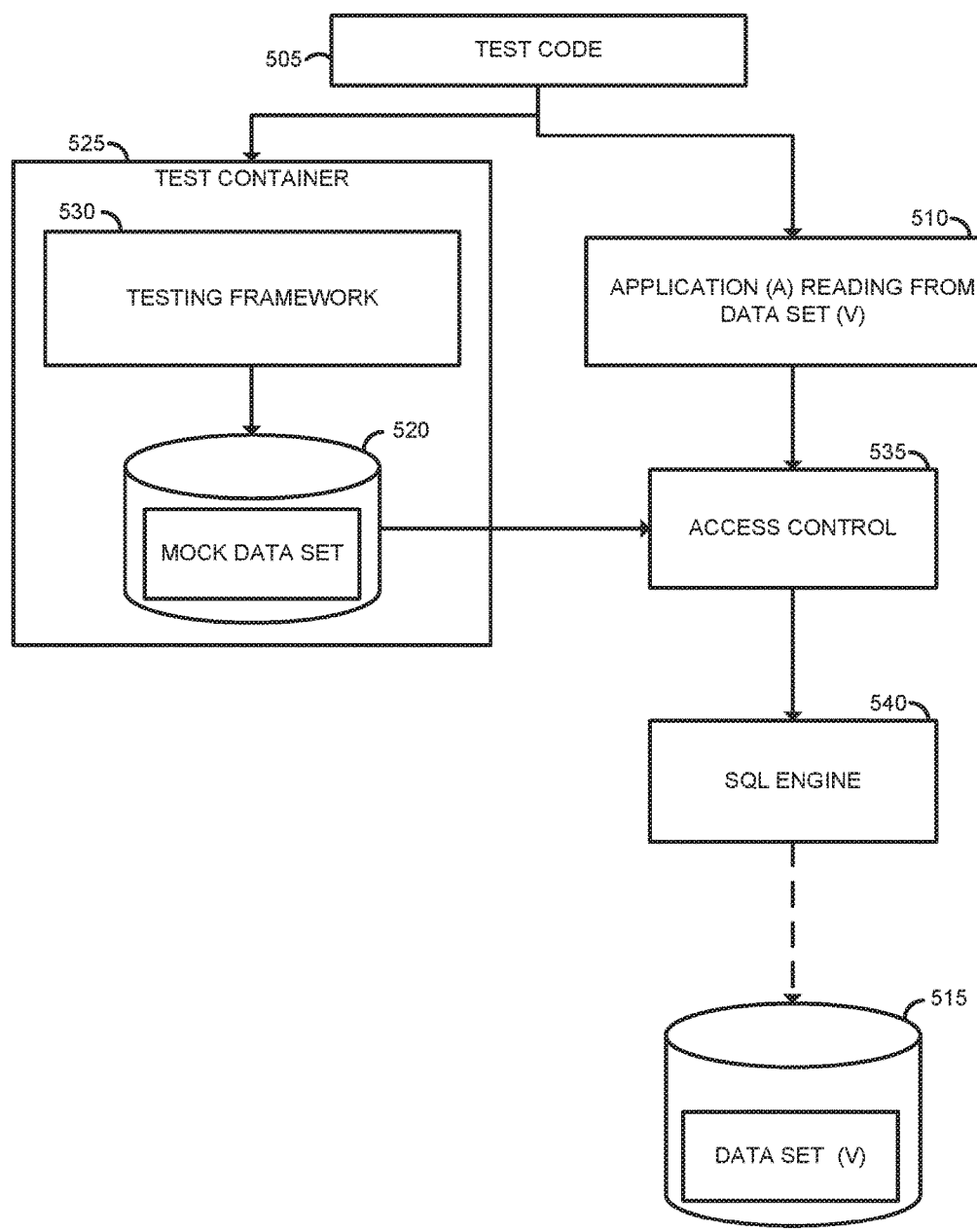
FIG. 5 is a flowchart illustrating an example machine interaction of the method for automatically validating access controls of FIG. 4, in accordance with some example embodiments.

In some embodiments, as shown in FIG. 5, the test data is received in conjunction with a set of test code 505. The set of test code 505 may comprise processor-executable instructions configured to initiate testing of an application 510 reading or interacting with data sets stored in a database 515 or other data storage structure or device. As shown in FIG. 5, the database 515 contains data set (V) comprising production data to be excluded during testing execution of the application. In some embodiments, the test code comprises one or more of the test data and a mock data set 515. The mock data set 515 may be distinct from production data (e.g., the data set (V) in database 515) used by the application 510 when in production. In some embodiments, the mock data set 515 contains one or more indicators representing a test status for the data within the mock data set 515, such that the data incorporates a distinguishing label differentiating the data from production data in the database 515.

Returning now to FIG. 4, in operation 420, the access component 320 accesses the application to initiate privilege testing for the application. The access component 320 may access the application once the test data has been incorporated into the test container. In such embodiments, the access component 320 accesses the test container within the application. The access component 320 retrieves the test data from the test component, inserting at least a portion of the test data into a runtime environment. In some instances, the test data is retrieved from a data environment (e.g., a data table, a database, a memory, or a processor-readable storage device) which is part of a controlled data environment. In some embodiments, the controlled data environment is populated only with test data. In such embodiments, the controlled data environment is configured to ensure no production data is stored along with the test data. In some instances, the controlled data environment is populated with data mocking, generated using a separate schemata, or other suitable methods for ensuring test data alone is contained within the controlled data environment.

In some embodiments, as shown in FIG. 5, the mock data set 520, received with or accessed in response to receiving one or more of the test data and the test code 505, is incorporated into a test container 525 upon receipt in operation 410. As shown, the test container 525, testing framework 530, and mock data set 520 are maintained separately from the application 510 and the database 515. In some embodiments, not shown, the test container 525, the testing framework 530, and the mock data set 520 are incorporated into a portion of the application during a testing phase or testing execution of the application.

Referring again to FIG. 4, in operation 430, the access component 320 accesses a data set to insert at least a portion of the data set into the application. In some embodiments, in response to retrieving the test data, the access component 320 identifies the data set as specified within the test data. The access component 320 retrieves at least a portion of the data set, inserting the portion of the data set into the runtime environment. In some embodiments, insertion of the portion of the data set is performed such that the portion of the data set is valid for testing in a thread in the runtime environment. In some instances, testing is limited to the runtime environment produced by the test framework and test container. In such instances, the validation system 112 precludes usage of the portion of the data set outside of a validation process using the current test data. In this way, users performing validation testing on privilege schemes may vary a set of virtual user data and validate the privilege scheme and expected behaviors of the privilege scheme without creation of a full user profile and without linking the testing to permissions of the user performing the validation test.

In some embodiments, as shown in FIG. 5, an access control element 535 receives the at least a portion of the mock data set 520 from the test container 525. In such embodiments, the access component 320 accesses the data set (e.g., the mock data set 520) and inserts the portion of the data set into the application 510. In some instances, the access control element 535 is a part of the application 510. The access control element 535 may be operated, controlled, or otherwise initiated by the access component 320.

Referring again to FIG. 4, in operation 440, the testing component 330 executes the application according to the one or more privilege elements of the test data. The testing component 330 executes the application using the data set accessed in operation 430. The testing component 330 may execute any portion or all of the processor-executable instructions of the application upon retrieval and insertion of the test data and the data set into the runtime environment. In some instances, the testing component 330 determines one or more portions of the processor-executable instructions of the application associated with one or more of the data set and the test data. Upon determination of the portions of the processor-executable instructions, the testing component 330 executes the selected portions without incorporating or executing portions of the application unassociated with the data set or the test data. As shown in FIG. 5, an SQL Engine 540, called by the application 510 executes operations of the application on the mock test data 520 instead of the database 515 containing the production data for the application.

In operation 450, the interaction component 340 generates a set of interaction indicators for the application representing interactions of the application with a portion of the data set using the one or more privilege elements. In some embodiments, the set of interaction indicators are results produced by executing operations of the processor-executable instructions from the application on the data set according to the one or more privilege elements of the test data. For example, the set of interaction indicators may be data retrieved from the data set, where the data is retrieved based on the execution of the operations of the application using privilege elements including a specified role and at least one specified resource privilege. In some embodiments, the testing component 330 injects a runtime inspector into the access control system. The runtime inspector automatically accesses and analyzes one or more logs produced by the application during testing execution. In such embodiments, the runtime inspector tests an access control component of the application (e.g., a portion of the application which implements access control declarations). During analysis, the runtime inspector determines whether an instance of failure to return data is based on the access control component of the application blocking access to the data or based on a lack of data to be accessed by the access control component.

In some instances, the interaction indicators represent the interactions without producing or disclosing results of the executed operations for the application. In such instances, for each operation executed for the application, the interaction component 340 determines whether the operation returned or produced a result matching an expected result. For each matching result, the interaction component 340 generates an interaction indicator representing a valid operation or portion of the test data. For each result failing to match the expected result, the interaction component 340 generates an interaction indicator representing an invalid operation or portion of test data, such as an error indicator.

In operation 460, the presentation component 350 causes presentation of the set of interaction indicators at a display device of a computing device. In some embodiments, the presentation component 350 causes presentation of the results produced by execution of the application's operations on the data set using the one or more privilege elements. In some instances, the presentation component 350 presents a subset of results. In such instances, the presentation component 350 presents a subset of interaction indicators of the set of interaction indicators. The presentation component 350 may determine a specified interaction type (e.g., failed interactions or successful interactions) and present the subset of interaction indicators associated with the specified interaction type.

In some embodiments, the presentation component 350 causes presentation of representative interaction indicators without presenting results generated by execution of the operations. In such embodiments, the presentation component 350 causes presentation of interaction indicators representing success, failure, errors, or other characteristics of execution of the operations of the application. For example, the presentation component 350 may cause presentation of indicators of one or more failures or errors encountered while executing the operations of the application. The failures or errors may indicate the operation, the portion of the data set, the privilege element, or combinations thereof resulting in the failure or error for the operation (e.g., the mismatch of the actual and the expected result of the operation).

Figure 6:
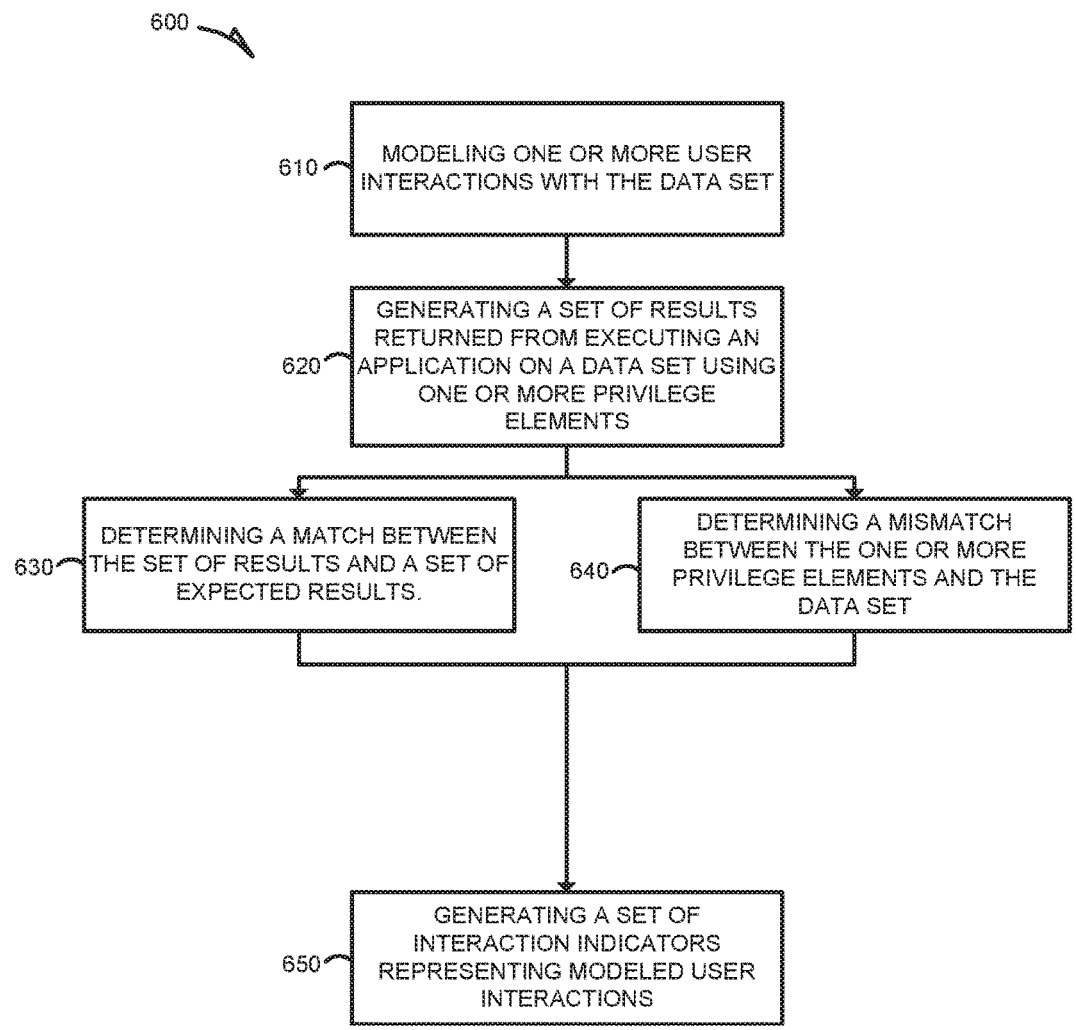
FIG. 6 is a flowchart illustrating an example method for automatically validating access controls defined within an application, in accordance with some example embodiments.

FIG. 6 is a flow chart illustrating a method 600 for automatically validating access controls defined within an application, according to an example embodiment. In some instances, certain operations of the method 600 are performed using one or more operations of the method 400 or as sub-operations of one or more operations of the method 400. Operations of the method 600 may be performed by components of the validation system 112. However, it should be understood that operations or portions of operations of the method 600 may be performed on the validation system 112, the client machine 116, the client/server machine 117, a mobile device, or combinations thereof.

In operation 610, the testing component 330 models one or more user interactions with the data set. The one or more user interactions perform at least one executable instruction of the application on the data set using the one or more privilege elements. In some embodiments, the testing component 330 calls an executable instruction of the application. The testing component 330 inserts an identification of the data set into a field of the executable instruction to indicate a data source on which the instruction is to be performed. The testing component 330 inserts the one or more privilege elements into one or more fields of the executable instruction to indicate privilege or access control credentials authorizing access to the data set under the privilege scheme. After inserting the identification of the data set and the one or more privilege elements, the testing component 330 attempts to execute the processor-executable instruction on the data set.

In some embodiments, in operation 620, in response to modeling the one or more user interactions, the testing component 330 generates a set of results returned from executing the application on the data set using the one or more privilege elements. In some embodiments, the set of results represent a match between the one or more privilege elements and the data set. In such embodiments, the testing component 330 attempts to execute operations of the application on the data set using the test data (e.g., the one or more privilege elements), where the testing component 330 receives a result from the data set or a database containing the data set, and the testing component 330 identifies the match between the data set and the one or more privilege elements. Where the testing component 330 receives no results from the data set or database, the testing component 330 identifies no match between the data set and the one or more privilege elements. In some instances, upon identifying no match, the testing component 330 generates an error or failure notification representing the failure to match the data set with the one or more privilege elements.

In operation 630, the testing component 330 determines a match between the set of results and an expected set of results. The testing component 330 compares the received results to the set of expected results based on one or more of the privilege scheme, the one or more privilege elements of the test data, and at least one characteristic of the data set. In embodiments where the testing component 330 determines the match between the set of results and the expected set of results based on the privilege scheme, the testing component 330 determines an organization for the privilege scheme. The organization for the privilege scheme may delineate separate privileges within the privilege scheme. In some instances, the organization for the privilege scheme may indicate conditions or attributes associated with each privilege. The testing component 330 compares the one or more privilege elements within the test data, and represented within the received data and the set of expected results, to the organization for the privilege scheme. The testing component 330 then determines the one or more privilege elements are inserted into the test data (e.g., the test container), and represented within the received and expected results, according to the organization of the privilege scheme.

In embodiments where the testing component 330 compares the received results to the set of expected results based on the one or more privilege elements, the testing component 330 determines privileges associated with first data received from the data set in the received results by execution of the application using the test data. The testing component 330 determines privileges associated with second data in the set of expected results. The testing component 330 compares the privileges associated with the first data, privileges associated with the second data, and the one or more privileges contained in the test data. The testing component 330 identifies a match between the received results and the set of expected results where the privilege element associated with the first data and the second data match and is included in the one or more privilege element in the test data.

In some embodiments, the expected results are generated or established for the test data by a responsible party associated with validation testing for the application or system, prior to initiating validation testing by the validation system 112. In such embodiments, the testing component 330 may match the received results (e.g., the set of results) and the set of expected results using any suitable comparison method. For example, the testing component 330 may compare the received results and the set of expected results using one or more of a semantic similarity, a bitwise comparison, a field or value comparison, combinations thereof, or any other suitable comparison method. The testing component 330 determines a match where comparison of a first data value from the received results and a second data value of the set of expected results comprise the same value. The first data value may be a portion of the data (e.g., a number, a variable, or a text string) retrieved from the data set based on a specified instruction of the application. The second data value may be a portion of the data (e.g., a number, a variable, or a text string) within the set of expected results based on a specified instruction of the application.

In some embodiments, the set of interaction indicators, described above with respect to operation 450, are generated in response to determining the match between the set of results and the set of expected results. In such instances, the interaction indicators represent the one or more modeled user interactions, results of the set of results corresponding to each modeled user interaction, and matches determined between the set of results and the set of expected results for each of the modeled user interactions.

In some embodiments, the set of interaction indicators, described above with respect to operation 450, are generated in response to generating the set of results. The interaction indicators represent the one or more modeled user interactions and results of the set of results corresponding to each modeled user interaction. In these instances, the set of results may be generated where the one or more privilege elements match the data set, and the testing component 330 may generate no results for a privilege element that does not match the portion of the data set indicated by the application instruction using the privilege element. As such, in these examples, receiving the set of results indicates a match between expected results and the received set of results. In such instances, the privilege scheme, or other aspects of the application or system, may preclude generation of the set of results where the one or more privileges of the test data fail to match or authorize use of the data set.

In some embodiments, in operation 640, in response to modeling the one or more user interactions, the testing component 330 determines a mismatch between the one or more privilege elements and the data set. For example, the expected results may be generated or established for the test data prior to initiating validation testing by the validation system 112. The testing component 330 compares the set of expected results with the set of results received from the data set using one or more comparison methods. Where the testing component 330 fails to identify a match between the received results and the set of expected results based on the privilege scheme, the one or more privilege elements, or the data included in the results, the testing component 330 determines a mismatch for the respective aspects being compared for the received and expected results.

In operation 650, the interaction component 340 generates a set of interaction indicators for the application representing interactions of the application with a portion of the data set using the one or more privilege elements. In these embodiments, the set of interaction indicators represents the one or more user interactions, the one or more privilege elements, and an error indication corresponding to the mismatch between the one or more privilege elements and the data set.

Figure 7:
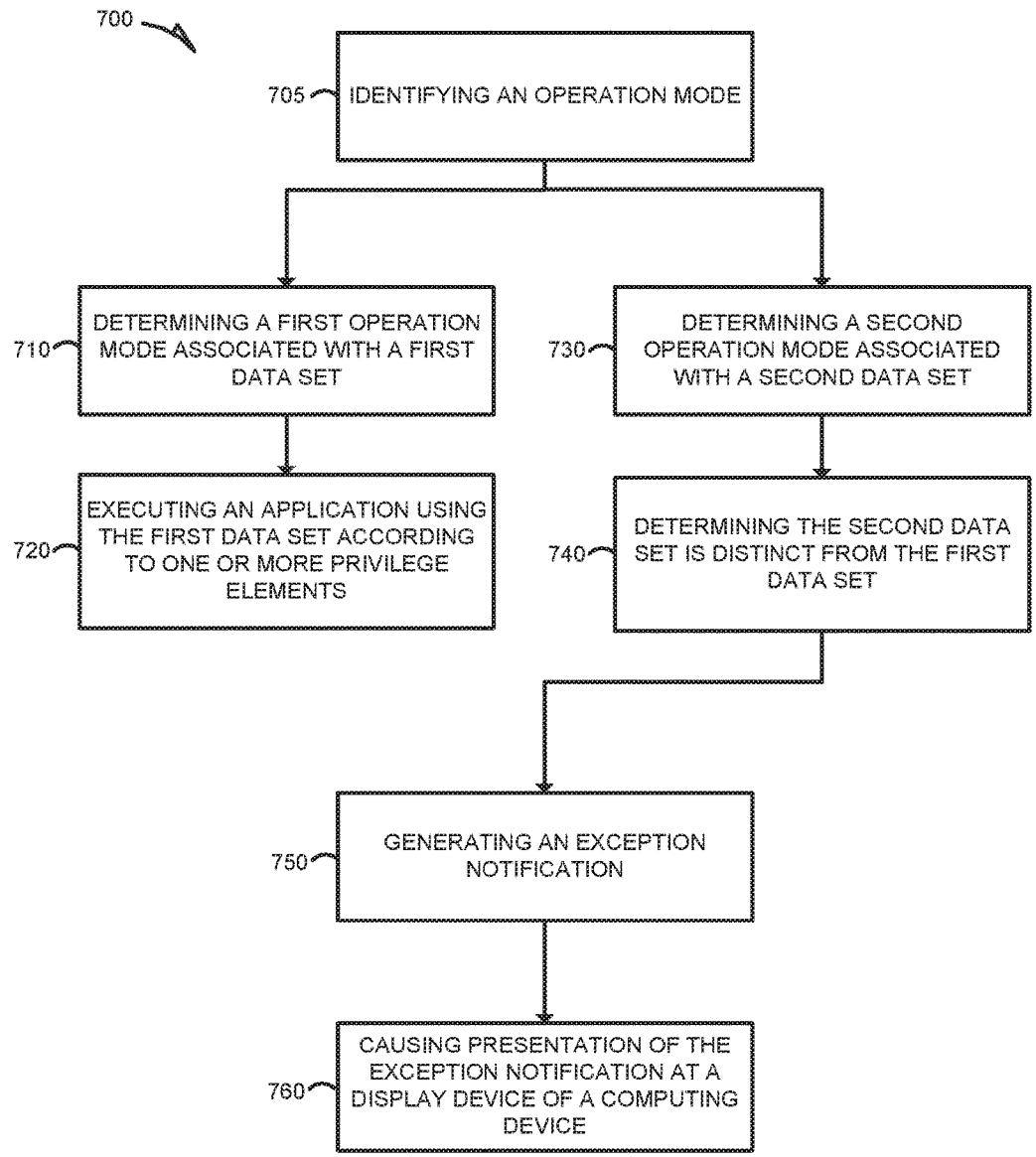
FIG. 7 is a flowchart illustrating an example method for automatically validating access controls defined within an application, in accordance with some example embodiments.

FIG. 7 is a flow chart illustrating a method 700 for automatically validating access controls defined within an application, according to an example embodiment. In some instances, certain operations of the method 700 are performed using one or more operations of the methods 400 or 600, or as sub-operations of one or more operations of the methods 400 or 600. Operations of the method 700 may be performed by components of the validation system 112. However, it should be understood that operations or portions of operations of the method 700 may be performed on the validation system 112, the client machine 116, the client/server machine 117, a mobile device, or combinations thereof.

In method 700, the testing component 330 initially identifies an operation mode of one or more of the applications and the validation system 112 in operation 705. In operation 710, the testing component 330 determines a first operation mode from a set of operation modes. The set of operation modes indicates data sets accessible by the application during execution. The first operation mode corresponds to a first data set. The first operation mode may correspond to a testing mode. In some embodiments, the first data set is the data set accessed in operation 430. Other modes of the set of operation modes comprise a production mode, an update mode, a programming mode, and any other suitable modes corresponding to varying types of operations associated with operation or maintenance of the application or system. The production mode may be a second mode corresponding to a second data set. The second data set comprises production or operations data distinct from testing data of the first data set and used during normal operation of the application or system.

In some instances, the testing component 330 determines the first operation mode based on a selection made by a user interacting with the application or system. In some embodiments, the testing component 330 determines the first operation mode based on access controls or permissions associated with the user interacting with the application or system. The testing component 330 may also determine the first operation mode based on access controls or permissions derived from an action taken by the user, a terminal or user device on which the user is interacting with the application or system, or an access method with which the user is interacting with the application or system.

In operation 720, in response to determining the first operation mode (e.g., a testing mode), the testing component 330 executes the application, using the first data set, according to the one or more privilege elements of the test data. In some embodiments, the testing component 330 performs operation 720 in a manner similar to or the same as performed in operation 440 or one or more of operations 610-650.

In some embodiments, in operation 730, the testing component 330 determines the second operation mode from the set of operation modes. The set of operation modes indicate data sets accessible by the application during execution. The second operation mode indicates a second data set. In some embodiments, the second operation mode is a productive mode indicating one or more of the validation system 112 and the application are in operation (e.g., live) and available for use outside of the testing framework. In some instances, the testing component 330 determines the second operation mode from a runtime characteristic of one or more of the application and the validation system 112. The runtime characteristic may indicate a current operative mode for the application or the validation system 112.

In operation 740, the testing component 330 determines the second data set is distinct from the first data set. The testing component 330 may determine the first data set and the second data set are distinct based on the association of the respective data sets with differing operating modes. In some embodiments, the testing component 330 determines the second data set and the first data set are distinct by comparing identification values (e.g., names, network addresses, or values) for the first data set and the second data set. Where the identification values fail to match, the testing component 330 determines the second data set and the first data set are distinct. In some instances, the testing component 330 determines the first and second data sets are distinct by comparing one or more data characteristics of data stored within the first data set and the second data set. In such instances, the testing component 330 may access the first data set and the second data set to identify included data types, data fields, or specified values within corresponding portions of the first data set and the second data set. Where the one or more data characteristics fail to match, the testing component 330 determines the first data set and the second data set are distinct.

In some embodiments, the testing component 330 determines the first or second operation mode based on user permissions or access control privileges of the user accessing the application. In such embodiments, the user is associated with sufficient permissions or privileges to access the second operation mode. Further, the permissions or privileges of the user may enable access to one of the first data set and the second data set. The testing component 330 may determine the first data set and the second data set are distinct based on the differing permissions or privileges of the user accessing the application. The testing component 330 may determine distinctions between the first and second operation modes and the first and second data sets to ensure that validation or testing procedures for the application are performed on a specified data set other than live or productive data for the application.

In operation 750, the interaction component 340 generates an exception notification in response to determining the second operation mode and the distinction between the first data set and the second data set. The exception notification indicates one or more of the second operation mode and the second data set indicated by the second operation mode. In these embodiments, the user may be attempting to access or perform testing operations for the application and the associated privilege scheme in a prohibited mode or without suitable access control privileges or permissions. The interaction component 340 may preclude the user, lacking suitable access control permissions or operative mode selections, from performing validation or testing based on the determinations of the testing component 330 in operations 710, 720, 730, and 740.

In operation 760, the presentation component 350 causes presentation of the exception notification at the display device of the computing device. In some embodiments, the presentation component 350 causes presentation of the exception notification by transmitting data comprising the exception notification to a client device in communication with the validation system 112. In some instances, the presentation component 350 causes presentation of the exception notification by causing display of the exception notification at a display device communicatively coupled to one or more of the client device or the validation system 112. Although described with respect to presenting the exception notification on a display device, it should be understood that the presentation component 350 may cause presentation of the exception notification in any suitable manner or combination of manners including video presentation, audio presentation, static display presentation, dynamic display presentation, haptic presentation, and combinations thereof.

Example Mobile Device

Figure 8:
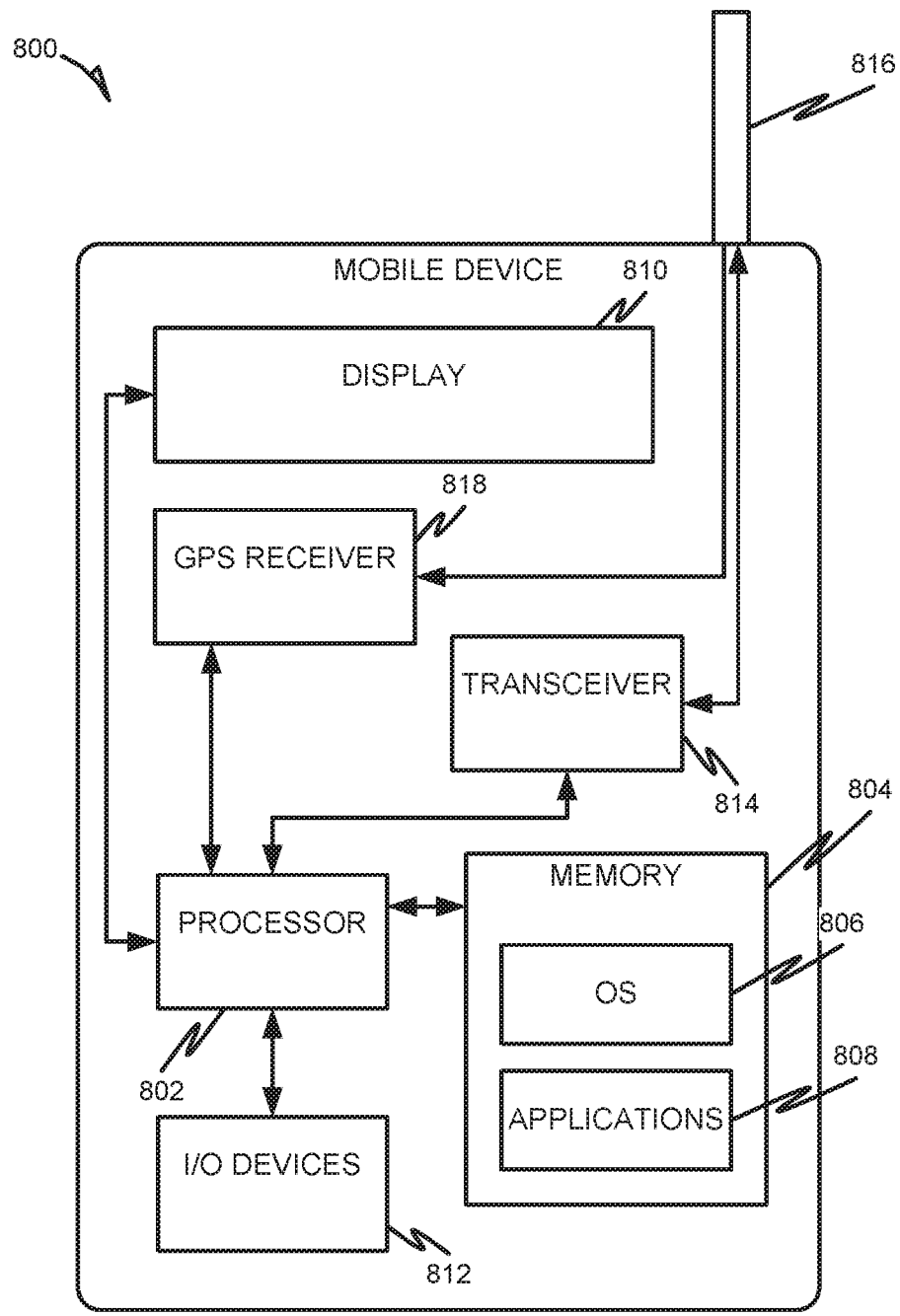
FIG. 8 is a block diagram illustrating a mobile device, in accordance with some example embodiments.

FIG. 8 is a block diagram illustrating a mobile device 800, according to an example embodiment. The mobile device 800 can include a processor 802. The processor 802 can be any of a variety of different types of commercially available processors suitable for mobile devices 800 (for example, an XScale architecture microprocessor, a Microprocessor without Interlocked Pipeline Stages (MIPS) architecture processor, or another type of processor). A non-transitory machine-readable storage medium 804, such as a memory, a random access memory (RAM), a Flash memory, or other type of memory, is typically accessible to the processor 802. The non-transitory machine-readable storage medium 804 can be adapted to store an operating system (OS) 806, as well as application programs 808, such as a mobile location-enabled application that can provide location-based services to a user. The processor 802 can be coupled, either directly or via appropriate intermediary hardware, to a display 810 and to one or more input/output (I/O) devices 812, such as a keypad, a touch panel sensor, a microphone, and the like. Similarly, in some embodiments, the processor 802 can be coupled to a transceiver 814 that interfaces with an antenna 816. The transceiver 814 can be configured to both transmit and receive cellular network signals, wireless data signals, or other types of signals via the antenna 816, depending on the nature of the mobile device 800. Further, in some configurations, a Global Positioning System (GPS) receiver 818 can also make use of the antenna 816 to receive GPS signals.

Modules, Components and Logic

Certain embodiments are described herein as including logic or a number of components, modules, or mechanisms. Modules can constitute either software modules (e.g., code embodied on a machine-readable medium or in a transmission signal) or hardware modules. A hardware module is a tangible unit capable of performing certain operations and can be configured or arranged in a certain manner. In example embodiments, one or more computer systems (e.g., a standalone, client, or server computer system) or one or more hardware modules of a computer system (e.g., a processor or a group of processors) can be configured by software (e.g., an application or application portion) as a hardware module that operates to perform certain operations as described herein.

In various embodiments, a hardware module can be implemented mechanically or electronically. For example, a hardware module can comprise dedicated circuitry or logic that is permanently configured (e.g., as a special-purpose processor, such as a field programmable gate array (FPGA) or an application-specific integrated circuit (ASIC)) to perform certain operations. A hardware module can also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) can be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor can be configured as respective different hardware modules at different times. Software can accordingly configure a processor, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple of such hardware modules exist contemporaneously, communications can be achieved through signal transmission (e.g., over appropriate circuits and buses) that connect the hardware modules. In embodiments in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or more processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or as a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the network 114 of FIG. 1) and via one or more appropriate interfaces (e.g., APIs).

Example embodiments can be implemented in digital electronic circuitry, or in computer hardware, firmware, software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Figure 9:
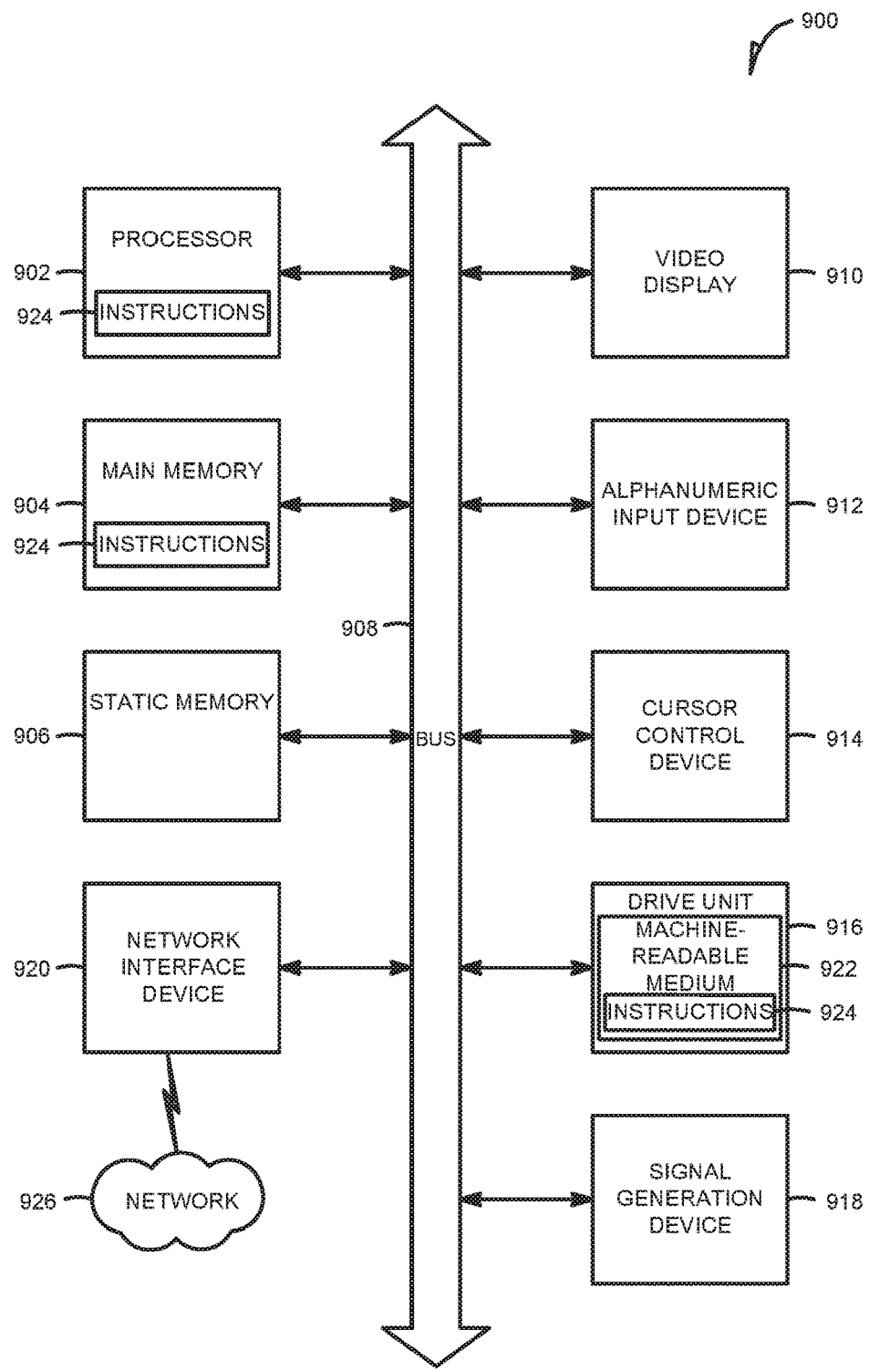
FIG. 9 is a block diagram of an example computer system on which methodologies described herein can be executed, in accordance with some example embodiments.

FIG. 9 is a block diagram of a machine in the example form of a computer system 900 within which instructions 924 for causing the machine to perform any one or more of the methodologies discussed herein can be executed, in accordance with an example embodiment. In alternative embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904 and a static memory 906, which communicate with each other via a bus 908. The main memory 904 and the static memory 906 may be implemented as non-transitory machine-readable storage mediums. The computer system 900 can further include a video display unit 910 (e.g., a liquid crystal display (LCD) or a cathode ray tube (CRT)). The computer system 900 also includes an alphanumeric input device 912 (e.g., a keyboard), a user interface (UI) navigation (or cursor control) device 914 (e.g., a mouse), a disk drive unit 916, a signal generation device 918 (e.g., a speaker), and a network interface device 920.

The disk drive unit 916 includes a machine-readable medium 922 on which is stored one or more sets of data structures and instructions 924 (e.g., software) embodying or utilized by any one or more of the methodologies or functions described herein. The instructions 924 can also reside, completely or at least partially, within the main memory 904 and/or within the processor 902 during execution thereof by the computer system 900, with the main memory 904 and the processor 902 also constituting machine-readable media. The instructions 924 can also reside, completely or at least partially, within the static memory 906.

While the machine-readable medium 922 is shown in an example embodiment to be a single medium, the term "machine-readable medium" can include a single medium or multiple media (e.g., a centralized or distributed database, and/or associated caches and servers) that store the one or more instructions 924 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks, magneto-optical disks; and compact disc-read-only memory (CD-ROM) and digital versatile disc (or digital video disc) read-only memory (DVD-ROM) disks.

The instructions 924 can further be transmitted or received over a communications network 926 using a transmission medium. The instructions 924 can be transmitted using the network interface device 920 and any one of a number of well-known transfer protocols (e.g., HTTP). Examples of communication networks include a Local Area Network (LAN), a Wide Area Network (WAN), the Internet, mobile telephone networks, Plain Old Telephone Service (POTS) networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system, comprising:
   one or more processors; and
   a processor-readable storage device in communication with the one or more processors, the processor-readable storage device comprising instructions that, when executed by the one or more processors, cause the one or more processors to perform operations comprising:
      receiving test data comprising one or more privilege elements, the test data received into a testing container defined within a set of processor-executable instructions comprising an application, the one or more privilege elements being selected from a set of privilege elements representing a privilege scheme;
      accessing, by the one or more processors, the application, with the test data incorporated into the testing container, to initiate privilege testing for the application;
      accessing, by the one or more processors, a data set to insert at least a portion of the data set into the application;
      executing, by the one or more processors, the application, using the data set, according to the one or more privilege elements of the test data;
      generating, by the one or more processors, a set of interaction indicators for the application representing interactions of the application with a portion of the data set using the one or more privilege elements; and
      causing presentation of the set of interaction indicators at a display device of a computing device.

2. The system of claim 1, wherein executing the application further comprises:
   modeling one or more user interactions with the data set, the one or more user interactions performing at least one executable instruction of the application on the data set using the one or more privilege elements.

3. The system of claim 2, wherein the operations further comprise:
in response to modeling the one or more user interactions, generating a set of results returned from executing the application on the data set using the one or more privilege elements, the set of results representing a match between the one or more privilege elements and the data set; and
determining a match between the set of results and an expected set of results.

4. The system of claim 3, wherein the set of interaction indicators is generated in response to generating the set of results, the interaction indicators representing the one or more modeled user interactions and results of the set of results corresponding to each modeled user interaction.

5. The system of claim 3, wherein the set of interaction indicators is generated in response to determining the match between the set of results and the expected set of results, the interaction indicators representing the one or more modeled user interactions, results of the set of results corresponding to each modeled user interaction, and matches determined for each of the modeled user interactions.

6. The system of claim 2, wherein the operations further comprise:
in response to modeling the one or more user interactions, determining a mismatch between the one or more privilege elements and the data set; and
wherein the set of interaction indicators represents the one or more user interactions, the one or more privilege elements, and an error indication corresponding to the mismatch between the one or more privilege elements and the data set.

7. The system of claim 1, wherein the data set is a first data set and the operations further comprise:
determining, by the one or more processors, a first operation mode from a set of operation modes, the set of operation modes indicating data sets accessible by the application during execution, the first operation mode indicating the first data set; and
in response to determining the first operation mode, executing the application, using the data set, according to the one or more privilege elements of the test data.

8. The system of claim 1, wherein the data set is a first data set and the operations further comprise:
determining, by the one or more processors, a second operation mode from a set of operation modes, the set of operation modes indicating data sets accessible by the application during execution, the second operation mode indicating a second data set;
determining the second data set is distinct from the first data set;
generating an exception notification indicating one or more of the second operation mode and the second data set indicated by the second operation mode; and
causing presentation of the exception notification at the display device of the computing device.

9. A method, comprising:
receiving test data comprising one or more privilege elements, the test data received into a testing container defined within a set of processor-executable instructions comprising an application, the one or more privilege elements being selected from a set of privilege elements representing a privilege scheme;
accessing, by one or more processors, the application, with the test data incorporated into the testing container, to initiate privilege testing for the application;
accessing, by the one or more processors, a data set to insert at least a portion of the data set into the application;
executing, by the one or more processors, the application, using the data set, according to the one or more privilege elements of the test data;
generating, by the one or more processors, a set of interaction indicators for the application representing interactions of the application with a portion of the data set using the one or more privilege elements; and
causing presentation of the set of interaction indicators at a display device of a computing device.

10. The method of claim 9, wherein executing the application further comprises:
modeling one or more user interactions with the data set, the one or more user interactions performing at least one executable instruction of the application on the data set using the one or more privilege elements.

11. The method of claim 10, further comprising:
in response to modeling the one or more user interactions, generating a set of results returned from executing the application on the data set using the one or more privilege elements, the set of results representing a match between the one or more privilege elements and the data set; and
determining a match between the set of results and an expected set of results.

12. The method of claim 10, further comprising:
in response to modeling the one or more user interactions, determining a mismatch between the one or more privilege elements and the data set; and
wherein the set of interaction indicators represents the one or more user interactions, the one or more privilege elements, and an error indication corresponding to the mismatch between the one or more privilege elements and the data set.

13. The method of claim 9, wherein the data set is a first data set and the method further comprises:
determining, by the one or more processors, a first operation mode from a set of operation modes, the set of operation modes indicating data sets accessible by the application during execution, the first operation mode indicating the first data set; and
in response to determining the first operation mode, executing the application, using the data set, according to the one or more privilege elements of the test data.

14. The method of claim 9, wherein the data set is a first data set and the method further comprises:
determining, by the one or more processors, a second operation mode from a set of operation modes, the set of operation modes indicating data sets accessible by the application during execution, the second operation mode indicating a second data set;
determining the second data set is distinct from the first data set;
generating an exception notification indicating one or more of the second operation mode and the second data set indicated by the second operation mode; and
causing presentation of the exception notification at the display device of the computing device.

15. A processor-readable storage device comprising instructions that, when executed by one or more processors of a machine, causes the machine to perform operations comprising:

receiving test data comprising one or more privilege elements, the test data received into a testing container defined within a set of processor-executable instructions comprising an application, the one or more privilege elements being selected from a set of privilege elements representing a privilege scheme;

accessing, by the one or more processors, the application, with the test data incorporated into the testing container, to initiate privilege testing for the application;

accessing, by the one or more processors, a data set to insert at least a portion of the data set into the application;

executing, by the one or more processors, the application, using the data set, according to the one or more privilege elements of the test data;

generating, by the one or more processors, a set of interaction indicators for the application representing interactions of the application with a portion of the data set using the one or more privilege elements; and causing presentation of the set of interaction indicators at a display device of a computing device.

16. The processor-readable storage device of claim 15, wherein executing the application further comprises:

modeling one or more user interactions with the data set, the one or more user interactions performing at least one executable instruction of the application on the data set using the one or more privilege elements.

17. The processor-readable storage device of claim 16, wherein the operations further comprise:

in response to modeling the one or more user interactions, generating a set of results returned from executing the application on the data set using the one or more privilege elements, the set of results representing a match between the one or more privilege elements and the data set; and determining a match between the set of results and an expected set of results.

18. The processor-readable storage device of claim 16, wherein the operations further comprise:

in response to modeling the one or more user interactions, determining a mismatch between the one or more privilege elements and the data set; and wherein the set of interaction indicators represents the one or more user interactions, the one or more privilege elements, and an error indication corresponding to the mismatch between the one or more privilege elements and the data set.

19. The processor-readable storage device of claim 15, wherein the data set is a first data set and the operations further comprise:

determining, by the one or more processors, a first operation mode from a set of operation modes, the set of operation modes indicating data sets accessible by the application during execution, the first operation mode indicating the first data set; and in response to determining the first operation mode, executing the application, using the data set, according to the one or more privilege elements of the test data.

20. The processor-readable storage device of claim 15, wherein the data set is a first data set and the operations further comprise:

determining, by the one or more processors, a second operation mode from a set of operation modes, the set of operation modes indicating data sets accessible by the application during execution, the second operation mode indicating a second data set;

determining the second data set is distinct from the first data set;

generating an exception notification indicating one or more of the second operation mode and the second data set indicated by the second operation mode; and causing presentation of the exception notification at the display device of the computing device.

* * * * *